United States Patent [19]

Eustache et al.

[11] Patent Number: 5,621,942
[45] Date of Patent: Apr. 22, 1997

[54] MOTOR VEHICLE HAVING A SCREEN WIPER FOR ITS REAR WINDOW AND A SUPPLEMENTARY REAR STOP LIGHT

[75] Inventors: Jean-Pierre Eustache, Antony; Jack Schitter, Antran, both of France

[73] Assignee: Valeo Systemes D'Essuyage, Montigny-le-Bretonneux, France

[21] Appl. No.: 331,689

[22] Filed: Oct. 31, 1994

[30] Foreign Application Priority Data

Nov. 4, 1993 [FR] France ................................. 93 13127

[51] Int. Cl.⁶ ................................. B60S 1/58; B60S 1/06
[52] U.S. Cl. ................. 15/250.3; 15/250.31; 15/250.001; 362/78; 362/80.1; 296/96.17; 296/96.15
[58] Field of Search .............................. 15/250.3, 250.31, 15/250.19, 250.001, 250.16, 250.23, 250.21, 250.17; 362/78, 80, 80.1; 296/96.15, 96.17, 185, 195, 76, 146.1

[56] References Cited

U.S. PATENT DOCUMENTS

| 4,353,111 | 10/1982 | Gallitzendorfer et al. | ............ | 15/250.3 |
| 5,243,502 | 9/1993 | Cappuccitti et al. | ................... | 362/80.1 |

FOREIGN PATENT DOCUMENTS

| 630834 | 6/1936 | Germany | ............................... | 15/250.3 |
| 866308 | 2/1953 | Germany | ............................... | 15/250.3 |
| 3406688 | 9/1985 | Germany . | | |
| 3807087 | 9/1989 | Germany | ............................... | 15/250.3 |
| 9107295 | 10/1991 | Germany . | | |
| 9312682 | 12/1993 | Germany . | | |
| 22235 | 2/1977 | Japan | ................................... | 15/250.3 |
| 83643 | 6/1980 | Japan | ................................... | 15/250.3 |
| 1448892 | 9/1976 | United Kingdom | ................. | 15/250.3 |

*Primary Examiner*—Gary K. Graham
*Attorney, Agent, or Firm*—Morgan & Finnegan, L.L.P.

[57] ABSTRACT

The rear part of a motor vehicle includes a rear window and a screen wiping apparatus for the rear window, comprising an electrical drive motor unit arranged inside the vehicle and having a drive shaft which projects out of the vehicle. The drive shaft extends through a bearing bush which is fitted in a hole formed through either the rear window or an adjacent portion of the vehicle body-work. A shouldered mounting bush is also fitted in this hole, around the bearing bush. The bearing bush has a threaded portion projecting externally, and the drive motor unit is secured to the vehicle by means of a nut which is tightened on this threaded portion. A rear light, typically a stop light arranged inside the vehicle so as to shine through the rear window, is secured on the screen wiping apparatus.

11 Claims, 4 Drawing Sheets

5,621,942

MOTOR VEHICLE HAVING A SCREEN WIPER FOR ITS REAR WINDOW AND A SUPPLEMENTARY REAR STOP LIGHT

FIELD OF THE INVENTION

The present invention relates to an arrangement of the rear part of a motor vehicle. More particularly, the invention is concerned with an arrangement of the rear part of a motor vehicle of the type having a rear window or rear screen, which is arranged to be wiped by means of a screen wiping apparatus that includes an electrical screen wiper drive motor unit disposed inside the vehicle and having an output spindle or drive shaft which, with its bearing (more commonly called a bush or bearing bush), extends through a through hole which is formed either in the rear window itself, or in a portion of the vehicle bodywork immediately surrounding the rear window, with a shouldered mounting bush being fitted in the through hole coaxially around the bearing bush, so that the screen wiper drive motor unit can be secured to the window or bodywork portion (as the case may be) by means of a nut, which is secured on a threaded portion of the bearing bush in which the drive shaft of the motor unit is supported, with this drive shaft projecting outside the vehicle so as to receive the drive head of the rear screen wiper which is also part of the wiping apparatus.

BACKGROUND OF THE INVENTION

Such a design has the particular advantage that it enables the screen wiping apparatus to be fixed in place merely by simply tightening a nut from outside the vehicle.

Some legal requirements also make it necessary to provide in the rear part of modern motor vehicles a supplementary indicating light, and more particularly a supplementary rear stop light, which is additional to the two stop lights arranged at the sides of the rear end, in the rear light clusters of the vehicle. This supplementary stop light is fitted inside the vehicle, in facing relationship with a portion of the rear window, and in particular just above the lower horizontal edge of the rear window.

It is known to arrange the supplementary rear stop light, in particular, so that it is fixed on the rear body panel if the vehicle has one, or else on another structural element of the body of the vehicle.

DISCUSSION OF THE INVENTION

The object of the present invention is to propose an arrangement for the rear part of a vehicle in which fitting and fastening of the screen wiping apparatus and of the supplementary rear light can be carried out in a single operation.

According to the invention, an arrangement of the rear part of a motor vehicle, as defined more particularly under the heading "Field of the Invention" above, is characterised in that the rear indicating light is carried directly by the screen wiping apparatus.

Various further and subsidiary features of the invention, each applicable by itself, or in combinations thereof, are as follows:

The said rear indicating light comprises a lighting unit carried by a lighting unit support member which is mounted on the drive motor unit of the screen wiper apparatus.

The lighting unit support member comprises a housing which receives the lighting unit.

The housing defines a substantially horizontal axial direction for the lighting unit (and therefore for the beam emitted by the said rear indicating light).

The lighting unit support member includes means for indexing it with respect to the screen wiping apparatus.

The lighting unit support member is fixed to the mounting bush.

The lighting unit support member comprises a frame within which the lighting unit is mounted, and which has an outer face which is fixed to an external radial edge of a shoulder element or flange defining the shoulder of the shouldered bush.

The shouldered mounting bush and the lighting unit support member are made integrally with each other as a single component.

The drive motor unit of the screen wiping apparatus includes a mounting bracket, and the lighting unit support member is carried by a lug of the said mounting bracket.

The lighting unit support member comprises a frame, within which the lighting unit is mounted, and which has an external face secured on a face of the lug of the mounting bracket in facing relationship with it.

The arrangement includes a cover member which is fixed to the lighting unit support member and which encloses the rear light and the screen wiper drive motor unit.

The drive motor unit of the screen wiping apparatus and the rear light are both connected electrically to a common connector, so that they can be connected up simultaneously to the electrical circuitry of the vehicle.

Further features and advantages of the invention will appear more clearly on a reading of the detailed description of the preferred embodiments of the invention which follows, and which is given by way of example only and with reference to the accompanying drawings.

DESCRIPTION OF PREFERRED EMBODIMENTS OF THE INVENTION

Figure 1:
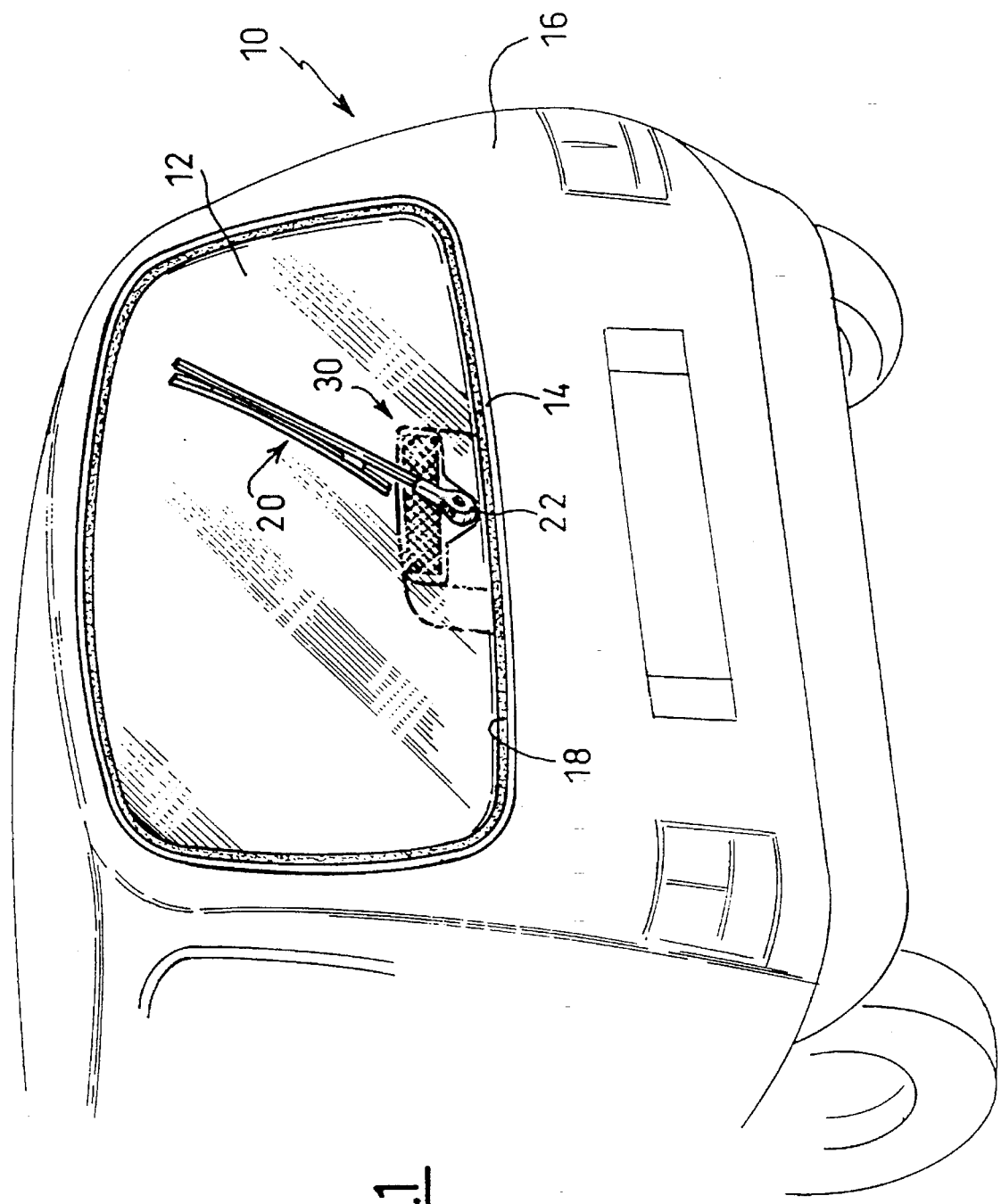
FIG. 1 is a diagrammatic perspective view of the rear part of a vehicle which is equipped in accordance with the present invention.
Figure 2:
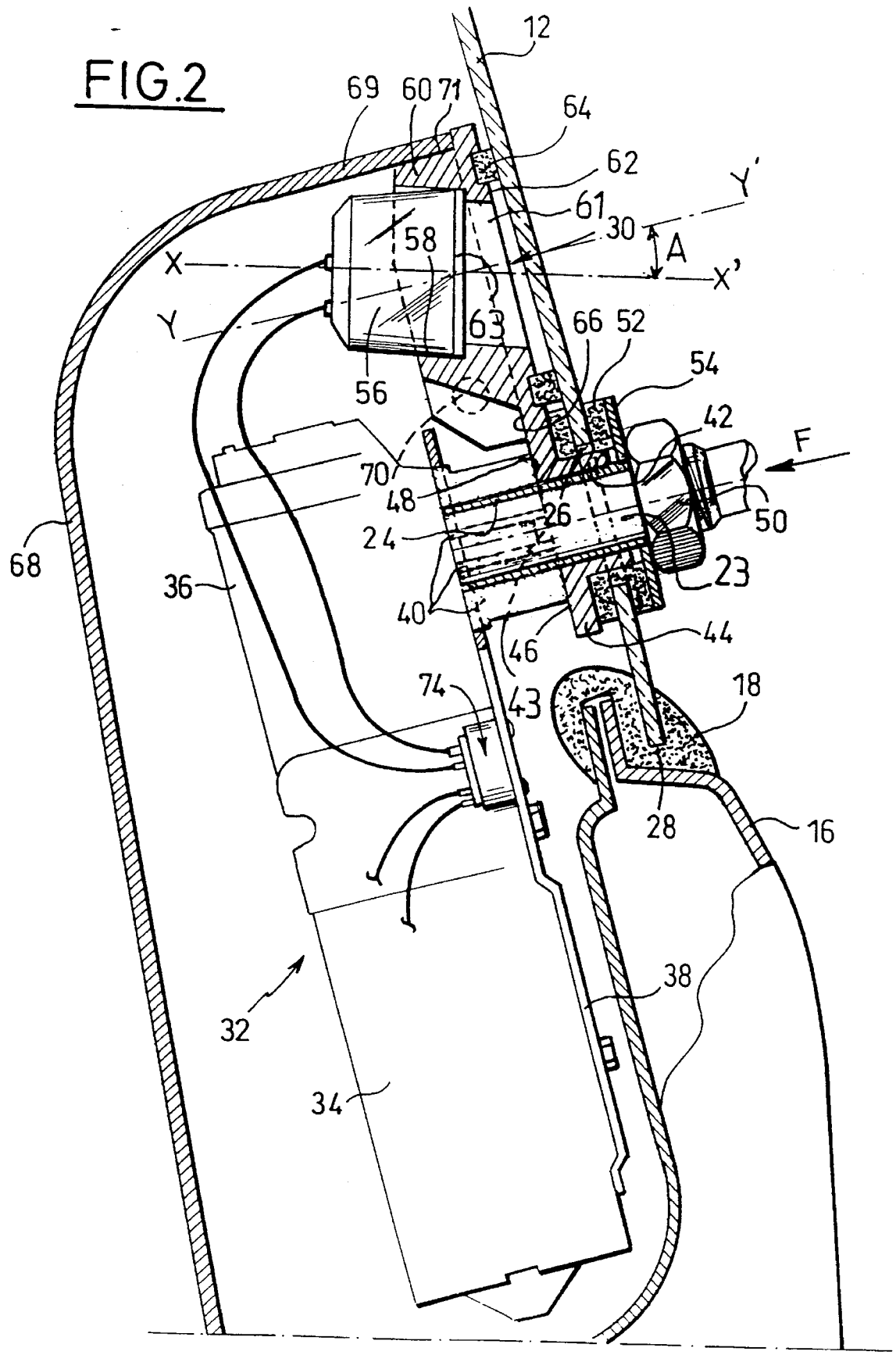
FIG. 2 is a view on a larger scale, in cross section through a central vertical plane passing through the axis of the drive spindle of the rear screen wiping apparatus, and shows a first embodiment of the equipment in accordance with the invention, comprising a rear indicating light and screen wiping apparatus.

FIG. 1 shows the rear part 10 of a motor vehicle, on which a rear window 12 can be seen. The window 12 is fitted in an opening 14 formed in the bodywork 16 of the vehicle, with a seal 18 interposed between the glass of the window and the perimeter of the aperture. The rear part of the vehicle 10 is equipped with a screen wiper 20 for wiping the rear window 12. The screen wiper 20 has a drive head 22 which is carried by a drive spindle 23 mounted coaxially in a bearing or bearing bush 24 (see FIG. 2), which lies in a through hole 26 formed in the rear window 12 close to the lower longitudinal edge 28 of the latter.

FIG. 1 also shows a rear indicating light, which in this example is a stop light 30, and Which is arranged inside the vehicle so as to be visible from outside through the rear window 12. The rear stop light 30 is mounted close to the lower longitudinal edge 28 of the rear window 12, in such a way as not to affect the visibility of the driver through the rear window 12. The stop light 30 is secured in the way which will now be described in greater detail with reference to FIGS. 2 and 3.

The drive spindle 23 and its bearing 24 are part of an electrical screen wiper drive motor unit 32. This unit essentially consists of an electric motor 34 and a speed reducing gearbox 36, which are carried by a mounting bracket 38. The mounting bracket 38 is made in the form of a sheet metal plate, which is secured on a suitable portion of the motor vehicle as described below.

The bearing bush 24 is provided with external longitudinal ribs 40 which are spaced apart circumferentially, so as to extend over part of the length of the bush, in such a way that they constitute an abutment base 48 which is spaced away from the free end of the bush 24. The drive motor unit 32 is secured to the rear part of the vehicle by means of a mounting bush 42 which is formed with an external radial shoulder element or flange 44. The annular end face 46 of the radial shoulder element 44 is in axial engagement against the abutment base 48 defined by the ribs 40, against which it is held by means of a fastening nut 50 which bears axially on a sealing washer 52. The latter is interposed between the annular cylindrical edge of the mounting bush 42 and the periphery of the through hole 46, with a washer 45 interposed between the nut 50 and sealing washer 52.

Tightening of the nut 50 causes the shouldered mounting bush 42 to be forced against the abutment base 48 of the ribs 40. It also causes the sealing washer 52 to be compressed, and this ensures that the spacing element constituted by the mounting bush 42 is immobilized both axially and against rotation with respect to the rear window 12.

The rear stop light 30 is carried directly by the screen wiping apparatus itself. In the first embodiment seen in FIG. 2, the rear stop light 30 is fixed on to the mounting bush 42. To this end, the rear stop light 30 comprises a lighting unit 56 defining a horizontal axis X—X'. The unit 56 is received and fitted into a generally rectangular housing 58. This housing 58 is formed in a lighting unit support member 60. The support member 60 is in the form of a rectangular frame, such that the stop light 30 is substantially horizontal, so that the light beam which it emits is also substantially horizontal. For this purpose, the housing 58 has an inclination A corresponding to an angle defined by the axis X—X' and an axis Y—Y' which is substantially normal to the glass 12.

In addition, the housing 58 extends towards the glass 12, through a rectangular opening 61 coaxial with the housing 58. The rectangular opening 61 is so dimensioned that it corresponds to the dimensions of the cover glass 63 of the stop light 30. The cover glass 63 may be with or without a lens. The front face 62 of the support member 60 for the lighting unit 56 bears against the inner face of the rear window 12, with a resilient foam pad 64 arranged between them.

With this support arrangement, the stop light 30 is located in its horizontal position by the housing 58, and enables the inclination of the glass 12 to be taken up because of the space which includes the opening 61 and which exists between the cover glass 63 of the stop light 30 and the glass 12.

Figure 3:
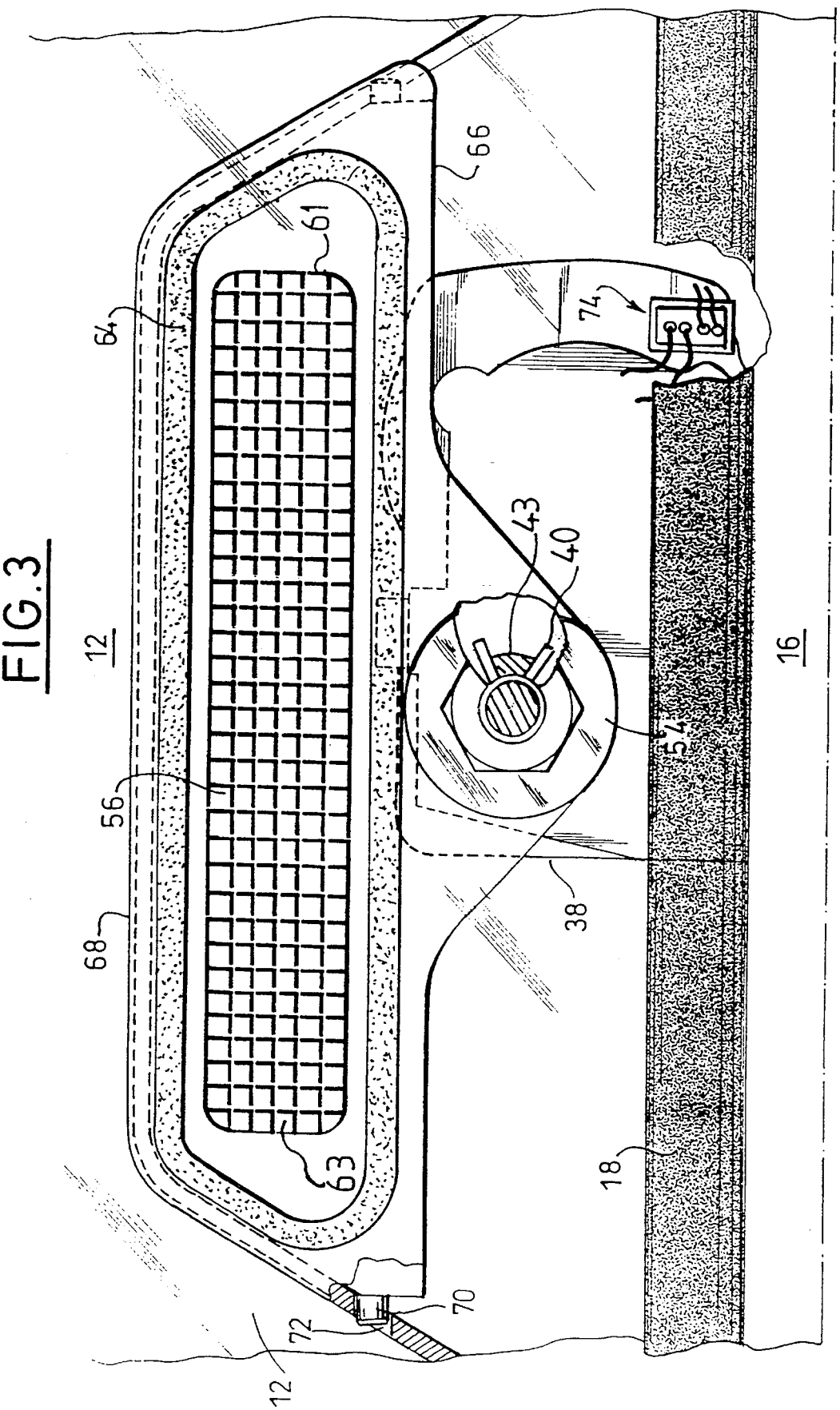
FIG. 3 is a view in elevation in the direction of the arrow in FIG. 2, shown partly cut away locally so as to illustrate one of the features of the invention.

The lower face 66 of the support member 60 is extended vertically downwards, and is made integrally with the shoulder element 44 of the mounting bush 42, as is best seen in FIG. 3.

The support member 60 also has means for providing angular indexation with respect to the screen wiping apparatus. More particularly, the shoulder element 44 of the mounting bush 42 has an axial projection 43 which extends in the opposite direction from the mounting bush 42 and which lies between two consecutive ribs 40, so as to immobilize the support member 60 against rotation with respect to the bearing bush 24. The thickness of this projection 43 is such as to be substantially equal to the distance between two consecutive ribs 40.

In this way, fitting of the drive motor unit 32 and of the stop light 30, together with the positioning of the latter, are obtained simultaneously during the fitting and fastening of the mounting bush 42.

The assembly consisting of the stop light 30 and the screen wiper drive motor unit 32 is masked by a casing or cover member 68, the upper edge 69 of which matches the shape of the upper face 71 of the frame that defines the support member 60. The casing or cover member 68 is secured on the support member 60 through two half-open recesses 72 which are fitted elastically on two pins 70 carried by the support member 60. These pins 70 are arranged close to the opposite longitudinal ends of the support member 60, as can be seen in FIG. 3.

As is also best seen in FIG. 3, the assembly consisting of the drive motor unit 32 and stop light 30 also includes an electrical connector 74 which is carried by the mounting bracket 38. The connector 74 is connected electrically to the stop light 30 and also to the electric drive motor unit 32, so that both of these two components can be connected simultaneously, in a single plugging-in operation of complementary electrical connectors, to the electrical circuitry of the vehicle.

Figure 4:
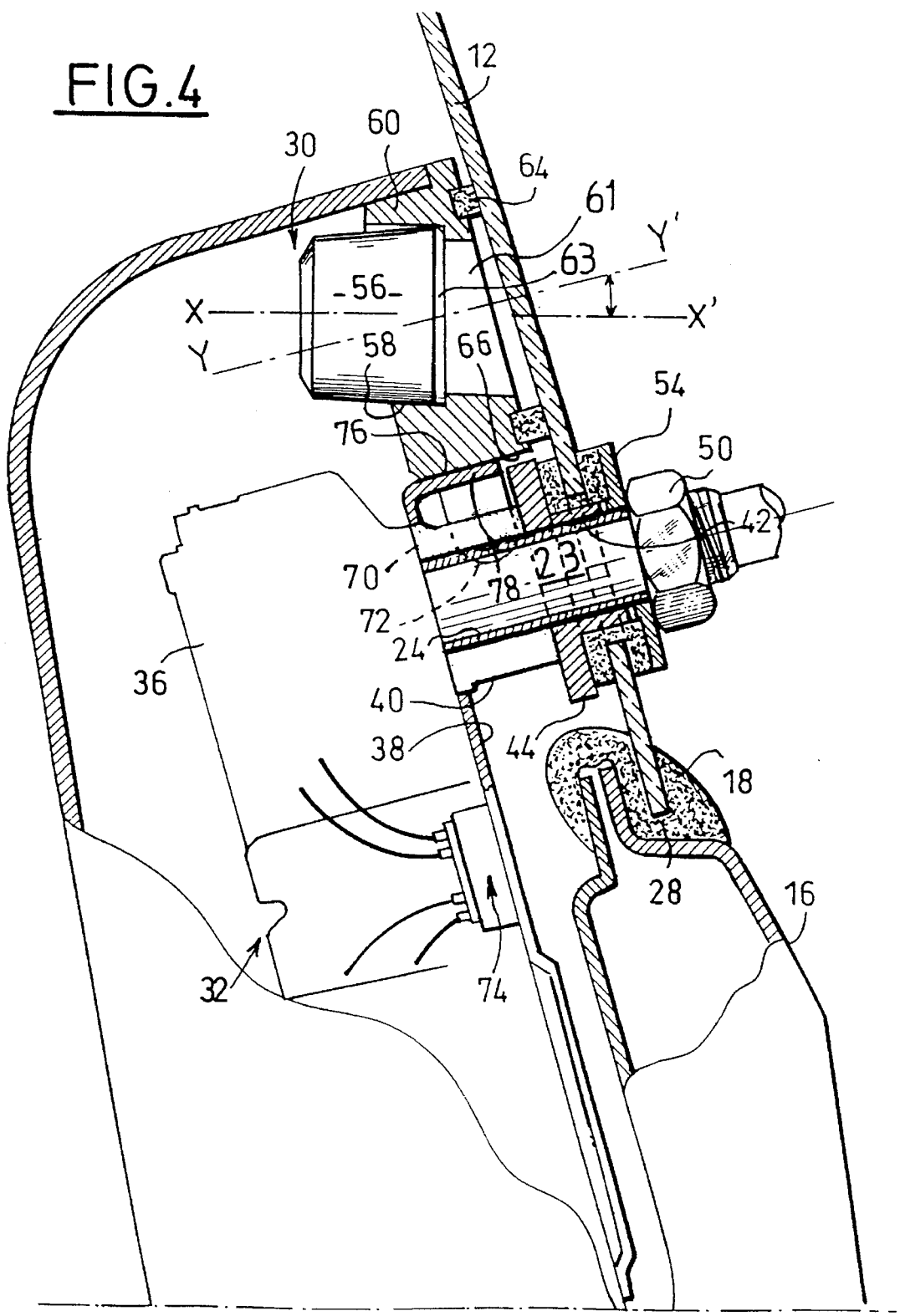
FIG. 4 is a view similar to that in FIG. 2, but shows a second embodiment of equipment in accordance with the invention.

Referring now to FIG. 4, in this second embodiment of the invention the lower face 66 of the support member 60, in the form of a frame for the lighting unit 56 of the stop light 30, is secured on the upper face 76, in facing relationship with it, of a lug 78. This lug 78 projects axially at the upper end of the support bracket 38, above the bearing bush 24 and the ribs 40 that define a mounting foot for the drive motor unit 32. The lower face 66 of the support member 60 may be secured to the latter by screw fastening, by adhesive bonding, or by welding, or in any other suitable way.

In this second version, the drive motor unit 32 and the rear stop light 30 constitute a one piece sub-assembly, prior to the operations of fitting and fastening the motor drive unit 32 on the rear window 12. In this design it is also possible to interpose a supplementary component between the support member 60 and the lug or lugs 78 of the support bracket 38, for the purpose of damping vibrations.

What is claimed is:

1. A motor vehicle having a body, said body including a rear window, a screen wiping apparatus for wiping the rear window, means for mounting the screen wiping apparatus to said vehicle body, and a rear light within the vehicle in facing relationship with a portion of the rear window, the screen wiping apparatus including a screen wiper drive motor unit within the vehicle, said drive motor unit having an output spindle and a bearing in which said output spindle is moveably mounted, the vehicle body having a through hole for receiving said bearing therethrough, said bearing having a threaded portion extending outside of the vehicle, said mounting means for the screen wiping apparatus comprising: a shouldered mounting bush fitted in said through hole and surrounding said bearing, and a fastening nut secured on said threaded portion of the bearing so as to secure the screen wiping apparatus to the vehicle body, wherein the rear light comprises a lighting unit support member carried by the screen wiping apparatus, and a lighting unit carried by the support member, and wherein said bearing includes a plurality of external longitudinal ribs spaced apart circumferentially and said shouldered mounting bush includes an axial projection which lies between consecutive ones of said ribs for angularly indexing said shouldered mounting bush with respect to said screen wiping apparatus.

2. A motor vehicle according to claim 1, wherein the lighting unit support member comprises a housing for receiving the lighting unit.

3. A motor vehicle according to claim 2, wherein said housing defines a substantially horizontal axial direction of the lighting unit.

4. A motor vehicle according to claim 1, wherein the lighting support member is secured to said shouldered mounting bush.

5. A motor vehicle according to claim 4, wherein the lighting unit support member defines a frame for receiving the lighting unit therein, said lighting unit support member having a outer face, the shouldered mounting bush having a shoulder with an outer radial edge, said outer face of the lighting unit support member being secured to said outer radial edge of said shoulder.

6. A motor vehicle according to claim 5, wherein said shouldered support member and said lighting unit support member are made integrally with each other so as to constitute a single component.

7. A motor vehicle according to claim 1, further including a cover member secured to the lighting unit support member and enclosing the lighting unit and the screen wiper drive motor unit.

8. A motor vehicle according to claim 1, further including a common electrical connector and means for connecting the screen wiper drive motor unit and the rear light electrically to said common connector, so that electrical connections to an electrical circuitry of the vehicle can be made simultaneously.

9. A motor vehicle according to claim 1, further including a resilient pad engaged against an inner surface of the rear window, the lighting unit support member being in engagement with the window through said pad.

10. A motor vehicle according to claim 1, wherein said screen wiper drive motor unit includes a mounting bracket having a lug, said lug carrying said lighting unit support member.

11. A motor vehicle according to claim 10, wherein said lighting unit support member defines a frame having a lower face, said frame for receiving said lighting unit, said lug of said mounting bracket having a face in facing relationship with said lower face of said frame, said lower face of said frame and said face of said lug being secured together.

* * * * *